United States Patent [19]

Moulindt

[11] Patent Number: 5,176,576
[45] Date of Patent: Jan. 5, 1993

[54] SEALING BELLOWS ARRANGEMENT FOR A TRANSMISSION JOINT

[75] Inventor: Francois Moulindt, Triel Sur Seine, France

[73] Assignee: Glaenzer Spicer, France

[21] Appl. No.: 620,882

[22] Filed: Nov. 29, 1990

[30] Foreign Application Priority Data

Nov. 30, 1989 [FR] France .................. 89 15827

[51] Int. Cl.⁵ .............................................. F16D 3/26
[52] U.S. Cl. .............................. 464/111; 277/212 FB; 403/51
[58] Field of Search ............... 464/170, 173, 175, 905, 464/906, 111; 277/212 FB, 181, 189; 403/50, 51

[56] References Cited

U.S. PATENT DOCUMENTS

| | | | |
|---|---|---|---|
| 2,945,364 | 7/1960 | Marquis et al. | 464/116 |
| 3,204,427 | 9/1965 | Dunn | 464/7 |
| 3,583,244 | 7/1971 | Teinert | 403/51 |
| 3,807,195 | 4/1974 | Faulbecker | 464/173 |
| 4,556,400 | 12/1985 | Krüde et al. | 464/181 |
| 4,767,381 | 8/1988 | Brown et al. | 464/906 X |
| 4,795,404 | 1/1989 | Sutton et al. | 464/111 |

FOREIGN PATENT DOCUMENTS

| | | |
|---|---|---|
| 2605459 | 8/1977 | Fed. Rep. of Germany . |
| 2933695 | 4/1981 | Fed. Rep. of Germany ...... 464/173 |
| 1438038 | 3/1966 | France . |
| 2085097 | 4/1982 | United Kingdom . |
| 2091381 | 7/1982 | United Kingdom . |
| 2160620 | 12/1985 | United Kingdom ............ 464/111 |

Primary Examiner—Daniel P. Stodola
Assistant Examiner—Tony A. Gayoso
Attorney, Agent, or Firm—Wenderoth, Lind & Ponack

[57] ABSTRACT

A transmission joint has a joint body integrally connected to a first shaft and delimits a cavity (14), open at its end opposite the first shaft. Inside is formed at least one pair of running tracks between which is received a running element connected to a second shaft. A bellows seals the cavity, and a first end of which is connected to the body and the second end of which is connected to the second shaft. The axial free end edge of the joint body which delimits the opening of the cavity is equipped with a cap piece of a complementary shape which extends axially from the edge towards the second shaft, and the first end of the bellows is fixed to the cap piece.

8 Claims, 1 Drawing Sheet

SEALING BELLOWS ARRANGEMENT FOR A TRANSMISSION JOINT

BACKGROUND OF THE INVENTION

1. Field of the Invention

The present invention relates to a transmission joint of the type comprising a body integrally connected to a first shaft which delimits a cavity at its end opposite the first shaft. Inside the cavity is formed at least one pair of running tracks between which is received a running element connected to a second shaft. A bellows sealing the cavity and a first end of which is connected to the body and the second end of which is connected to the second shaft.

2. State of the Prior Art

Various types of transmission joints are known, such as, for example, a tripod constant-velocity joint, in which joint the fixing of a sealing bellows is effected directly onto a body, also called a tulip. The outer profile of the tulip is complex, and the fixing of the sealing bellows requires numerous machining operations to be carried out on it.

SUMMARY OF THE INVENTION

The object of the present invention is to provide a transmission joint in which the mounting of a sealing bellows is simplified and which requires only a minimum of machined surfaces on the body of the joint.

To this end, the invention provides a transmission joint of the abovementioned type, characterized in that the axial free end edge of the body which delimits the opening of the cavity is equipped with a cap piece of a complementary shape which extends axially from the axial free end edge towards the second shaft, and in that the first end of the bellows is fixed to the cap piece.

According to other features of the invention:

the cap piece comprises a plane radial end face which interacts with a corresponding plane radial face of the axial free end edge of the body, means being provided for maintaining the bearing between these two radial surfaces;

the means for maintaining the bearing comprises at least one fastening tab of the cap piece which extends axially towards the first shaft, a the free bent-back end of which is received in a corresponding notch formed in the body;

a sealing strip is provided between the radial surfaces bearing on each other, for example in a groove of the cap piece;

the transmission joint comprises means for angularly indexing the cap piece relative to the body of the joint;

the free end of the cap piece opposite the body of the joint comprises a cylindrical bearing surface on which is fixed a first sleeve-shaped end of the bellows; and the cap piece is made from plastic.

BRIEF DESCRIPTION OF THE DRAWINGS

Other features and advantages of the invention will become apparent upon reading the detailed description below, for the comprehension of which reference should be made to the attached drawings, in which.

DETAILED DESCRIPTION OF THE PREFERRED EMBODIMENTS

Figure 1:
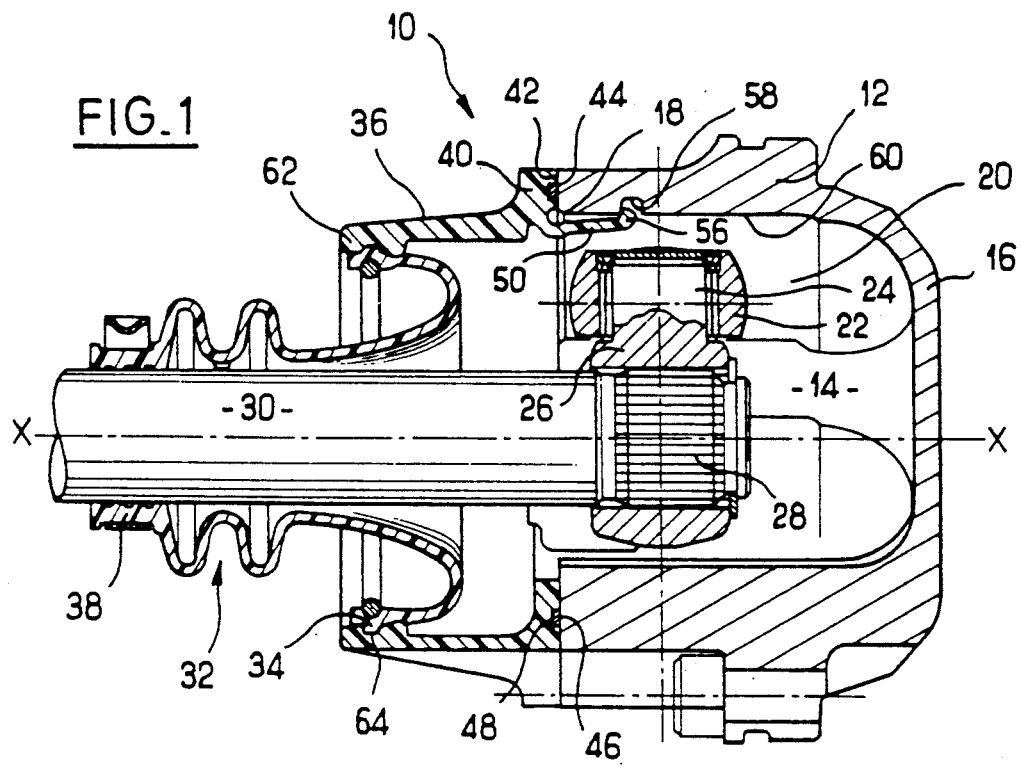
FIG. 1 is a view, partially in axial section, of a transmission joint constructed in accordance with the teachings of the invention.

A constant-velocity transmission joint 10 with rollers is shown in FIG. 1.

The joint 10 comprises a joint body 12, also called a tulip, which is provided in order to be connected to a first shaft (not shown).

The joint body 12 delimits an internal cavity 14 which, on the side of the first shaft, is closed by a bottom 16, and which is open at its opposite end, the opening of the cavity 14 being delimited by a free axial end edge 18.

In the embodiment shown in FIG. 1, the transmission joint is a joint of the tripod type and the body 12 therefore comprises three pairs of running tracks 20. The transmission joint has ternary symmetry about the axis of alignment X—X, and each pair of running tracks 20 receives a running roller 22 which is mounted rotatably on a corresponding arm 24 of a tripod 26.

The tripod 26 is fixed to the end 28 of a second shaft 30.

In order to ensure the leaktightness of the cavity 14, which accommodates the tripod 26 and the rollers 24, and which is filled with a lubricating agent, the joint 10 comprises a sealing bellows 32.

In accordance with the invention, the first sleeve-shaped end 34 of the bellows 32 is connected to the joint body 12 via a cap piece 36.

In a known manner, the second sleeve-shaped end 38 of the sealing bellows 32 is fixed to the second shaft 30.

The cap piece 36 is a plastic piece which extends axially from the end edge 18 of the body 12 towards the second shaft 30 and parallel to the axis of the body 12.

At its first lateral end 40, on the right-hand side in FIG. 1, the cap piece comprises a plane radial face 42 which bears against a radial face 44 of the joint body 12.

The radial face 44 is a plane face smoothed in the zone of the axial end edge 18 of the body of the joint 12 in order to enable the cap piece 36 to bear against is correctly. A sealing strip 46 between the radial surfaces 42 and 44 is provided in a groove 48 formed in the radial face 42 of the cap piece 36. The seal 46 can be previously included in the cap piece 36 during the injection-moulding operation of the latter.

The cap piece 36 is retained axially in the body 12 by three fastening tabs 50 which, in this first embodiment, extend axially inside the cavity 14 such that free bent-back ends 56 are received in corresponding notches 58 formed in the rough internal wall 60 which delimits the cavity 14.

The interaction of the ends 56 with the notches 58, if the latter have a limited angular length, constitutes means for angularly indexing the cap piece 36 relative to the body of the joint 12. This angular indexing is necessary because the first end 40 has a profile complementing that of the free end edge 18, which is not a body of revolution about the axis X—X, as can be seen by comparing the upper and lower parts of FIG. 1.

On the other hand, starting from its first end 40, the cap piece 36 has a shape such that its second end 62 is a body of revolution. The first end 34 of the bellows 32 is thus in the shape of a cylindrical sleeve and is maintained and fixed in a cylindrical bearing surface 64 arranged inside the cap piece 36. A rib on the exterior of the first end 34 engages a groove on said cylindrical bearing surface 64.

Figure 2:
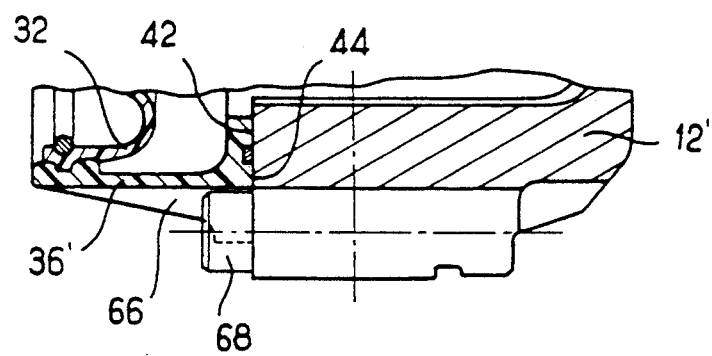
FIG. 2 is a detail view of a second embodiment of the invention.

In the second embodiment shown in FIG. 2, the means for angularly indexing a cap piece 36' relative to joint body 12' are realised by the interaction of external radial ribs 66 of the cap piece, which permit the passage of the screws 68 for mounting the joint, with the heads of these screws.

Figure 3:
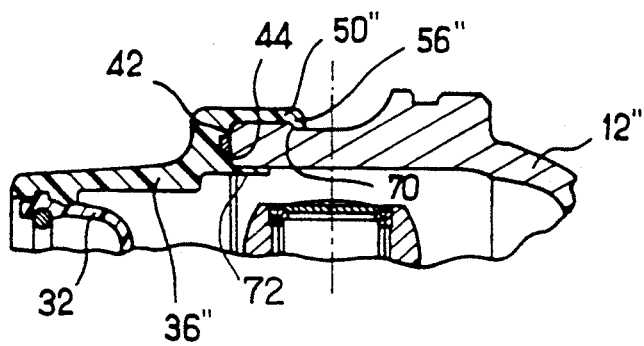
FIG. 3 is a detail view of a third embodiment of the invention.

In third embodiment shown in FIG. 3, the fastening tabs 50" are situated outside joint body 12", and their bent-back end 56 interacts with a radial shoulder 70 provided on the external surface of the joint body 12".

The means for angularly indexing the cap piece 36" relative to the joint body 12 consist of curved tongues 72 which extend axially inside the cavity 14 and which interact with portions of a corresponding profile of the internal surface 60 of the cavity 14, which portions join together the two running tracks of a same pair.

The mounting of the bellows 32 on the joint body 12 via a cap piece 36 according to the invention requires the smoothing machining of only a single surface 44 on the joint body 12, it being possible for the other surfaces interacting, in particular, with the fastening means and the angular-indexing means, to be rough.

I claim:

1. A transmission joint, comprising:
   a joint body integrally connected to a first shaft, said joint body defining a cavity having an open end opposite to said first shaft, said cavity having at least one pair of running tracks formed therein, and said joint body further having an axial free end edge defining said open end of said cavity;
   a running element for engagement with said running tracks connected to a second shaft;
   a cap piece having a shape complementary to the shape of said axial free end edge of said joint body extending axially from said free end edge away from said first shaft and toward said second shaft;
   a sealing bellows sealing said cavity having a first end fixed to said cap piece and a second end connected to said second shaft; and
   means for maintaining said cap piece on said axial free end edge of said joint body, said maintaining means comprising at least one fastening tab extending from said cap piece axially towards said first shaft inside said cavity and at least one respective notch inside said cavity, said fastening tab having a free bent-back end engaging said notch.

2. The transmission joint of claim 1, wherein said cap piece has a first end at which said cap piece is maintained on said axial free end edge and a free second end spaced therefrom away from said first shaft, said sealing bellows having said first end thereof connected to a cylindrical bearing surface of said second end of said cap piece.

3. The transmission joint of claim 2, wherein said cylindrical bearing surface has a groove therein and said first end of said sealing bellows has a circumferential rib on the exterior thereof engaging said groove.

4. The transmission joint of claim 1, wherein said cap piece has a plane radial end face and said axial free end edge has a plane radial face, said plane radial faces engaging each other, with said means for maintaining maintaining the engagement therebetween.

5. The transmission joint of claim 4, wherein a sealing strip is provided between said plane radial faces.

6. The transmission joint of claim 4, wherein said plane radial face of said cap piece has a groove therein and a sealing strip disposed in said groove.

7. The transmission joint of claim 1, and further comprising means for angularly aligning said cap piece relative to said joint body.

8. The transmission joint of claim 1, wherein said cap piece is made of plastic.

* * * * *